US008833702B2

(12) United States Patent
Briskman (10) Patent No.: US 8,833,702 B2
(45) Date of Patent: Sep. 16, 2014

(54) AUTONOMOUS SATELLITE ORBITAL DEBRIS AVOIDANCE SYSTEM AND METHOD

(71) Applicant: Robert Briskman, Rockville, MD (US)

(72) Inventor: Robert Briskman, Rockville, MD (US)

( * ) Notice: Subject to any disclaimer, the term of this patent is extended or adjusted under 35 U.S.C. 154(b) by 0 days.

(21) Appl. No.: 13/986,059

(22) Filed: Mar. 27, 2013

(65) Prior Publication Data

US 2013/0292517 A1 Nov. 7, 2013

Related U.S. Application Data

(60) Provisional application No. 61/688,071, filed on May 7, 2012.

(51) Int. Cl.
*B64G 1/24* (2006.01)

(52) U.S. Cl.
CPC . *B64G 1/242* (2013.01); *B64G 1/24* (2013.01)
USPC .................. 244/158.8; 244/158.6; 244/172.4

(58) Field of Classification Search
USPC .......... 244/158.1, 158.4, 158.6–158.8, 171.7, 244/172.4, 172.5
See application file for complete search history.

(56) References Cited

U.S. PATENT DOCUMENTS

| | | | |
|---|---|---|---|
| 4,991,799 A | | 2/1991 | Petro |
| 5,120,008 A | * | 6/1992 | Ramohalli ................. 244/171.7 |
| 5,153,407 A | | 10/1992 | Schall |
| 5,868,358 A | * | 2/1999 | Nakamura ..................... 244/169 |
| 6,142,423 A | * | 11/2000 | Wehner ......................... 244/164 |
| 6,667,713 B2 | | 12/2003 | Green et al. |
| 6,995,705 B2 | * | 2/2006 | Bradford et al. ................ 342/95 |
| 7,105,791 B1 | * | 9/2006 | Poller ........................ 250/203.1 |
| 7,437,246 B2 | * | 10/2008 | Kelly et al. .................... 701/301 |
| 7,551,121 B1 | | 6/2009 | O'Connell et al. |
| 8,275,498 B2 | * | 9/2012 | Alfano ............................. 701/13 |
| 8,386,099 B2 | * | 2/2013 | Carrico et al. ................... 701/13 |
| 8,567,725 B2 | * | 10/2013 | Wright ....................... 244/171.7 |
| 2004/0075605 A1 | | 4/2004 | Bradford et al. |
| 2008/0033648 A1 | | 2/2008 | Kelly et al. |
| 2009/0132105 A1 | | 5/2009 | Paluszek et al. |
| 2010/0049440 A1 | | 2/2010 | Alfano |
| 2010/0250137 A1 | * | 9/2010 | Hoots ........................... 701/301 |
| 2011/0196550 A1 | | 8/2011 | Carrico, Jr. et al. |
| 2012/0016541 A1 | * | 1/2012 | Alfano ............................. 701/13 |

OTHER PUBLICATIONS

International Search Report and Written Opinion of the International Searching Authority for PCT/US 13/00159 dated Dec. 20, 2013.

* cited by examiner

*Primary Examiner* — Timothy D Collins
*Assistant Examiner* — Jamie S Stehle
(74) *Attorney, Agent, or Firm* — Douglas C. Wyatt (57) ABSTRACT

An autonomous system for a satellite which calculates collision paths of debris from anywhere within the spheroid around the satellite by using its radar/ladar data and from data on its own orbit derived by onboard sensors such as star, earth and sun sensors or from stored data sent from its ground control station through the satellite's command subsystem. If a collision would be likely, the system calculates the minimum change in the satellite's orbit to avoid such collision and generates and executes commands for firing on-board orbital control thrusters to put the satellite in a suitable avoidance orbit.

31 Claims, 4 Drawing Sheets

AUTONOMOUS SATELLITE ORBITAL DEBRIS AVOIDANCE SYSTEM AND METHOD

RELATED APPLICATIONS

This application is related to U.S. provisional application Ser. No. 61/688,071 having a filing date of May 7, 2012.

BACKGROUND OF THE INVENTION

Outer space has considerable debris as described in Committee on Space Debris, National Research Council; Orbital Debris: A Technical Assessment; National Academy Press, ISBM-10:0-309-05125-8; Wash., D.C. 1995. This debris around the earth has been created by the whole or parts of satellites and launch vehicles which have been placed in orbit, especially over the past four decades. Several of these objects were intentionally destroyed, as described by P. Hattis in The Growing Menace of Orbital Debris; Draper Laboratory; Livebetter Center for a Better Life; 2011, unintentionally exploded or intentionally blown up creating small debris. Such debris created in orbits which are higher than the earth's atmosphere will remain there indefinitely. The problem of debris impacting operating satellites is now recognized, and many developed countries have taken action to mitigate further growth in debris as described by D. Baiocchi and William Welser IV in Confronting Space Debris; Rand Corporation; ISBM-978-0-8330-5056-4. It has been recognized for decades that removal of debris should be accomplished, but nothing yet has been done due to economic, legal and political issues, as described by me in Rouge Commercial Geosynchronous Communications Satellites; IEEE Transactions on Broadcasting; BC-33, NO. 1; March 1987.

Communication and broadcast satellites can typically require up to $250 million for construction, launch and insurance. These satellites generally have a design lifetime of 15-18 years. Besides the cost of loss due to collision with orbital debris, the satellite may serve many millions of customers and its replacement typically takes three years. This results in serious loss of service to customers and of operating revenues.

Since debris is a hazard to operating satellites and the amount of orbital debris is still increasing, albeit at a slower rate than in the past, some satellite operators (including the manned International Space Station) take the information on debris location and orbit from ground radars, particularly the US government's NORAD radar complex, and send commands to move the operating satellites so their orbits avoid collision with the debris. The ground radar data become less effective as the distance to the debris increases and for smaller sizes of debris.

OBJECTS OF THE INVENTION

A system and method for satellite orbital debris avoidance according to the invention allows an operating satellite to avoid orbital debris autonomously or semi-autonomously.

The benefits of the innovation provided by this invention permit the satellite operator to not require ground stations for orbital debris assessment and needed countermeasures.

Debris tracking can be superior on the satellite, since ground station radars must contend with attenuation and errors caused by the atmosphere and ionosphere.

Satellites generally have almost full view of the spheroid, since debris can come from any direction, whereas a single ground station can practically see somewhat under half of the spheroid.

Multiple ground stations can overcome the coverage deficiency referred to above. A geostationary satellite would require three ground stations spaced about 120 degrees in longitude, and lower orbiting satellites would require many more than three ground stations. Such ground stations are expensive in capital and have significant operations costs including their inter-communications.

The inclusion of an autonomous debris avoidance system according to the invention on larger satellites is particularly effective since much of the computing power is normally already included, making the modest equipment and programming additions feasible, and the combination of existing computer subsystems in the satellite is a particularly effective implementation.

In addition to the above, an operator could easily add other supplementary capabilities without any more satellite hardware and only small software additions. Besides determining an avoidance orbit which minimizes satellite propulsion fuel, the satellite could also determine if a chosen avoidance orbit is safe from collision with other satellites and with other debris. It could also determine the effect of the chosen avoidance orbit on the satellite's system operational performance.

An important benefit of autonomous satellite avoidance is the speed of operation, especially for random small debris which might be invisible or difficult to track by ground stations. The extra time required for ground station acquisition, processing, relay of the avoidance data to the satellite and its required confirmation of proper receipt could allow for the collision to occur.

SUMMARY OF THE INVENTION

In one embodiment, a satellite is constructed with such a system having an orbital debris tracking subsystem to detect and track objects using a microwave or light (LADAR) frequency radar or similar sensors/detectors. Detection and tracking equipment can include higher frequency microwave or laser radars, which may be preferable under certain circumstances because their resolution of debris size and motion is better, the required antenna on the satellite will be smaller and atmospheric attenuation is not a problem (since the satellite and debris are typically well above the atmosphere). The satellite has onboard computer capability which calculates from its radar/ladar data and from data on its own orbit (derived from onboard sensors such as star, earth and sun sensors, GPS receivers, and/or from stored data sent from its ground control station through the satellite's command subsystem) if a collision could occur. If a collision would be likely, the computer calculates the minimum change in the satellite's orbit to avoid such collision and generates commands for firing on-board orbital control thrusters to put the satellite in an avoidance orbit. Other than the radar/ladar, most large, modern communications and broadcast satellites currently have the aforementioned onboard sensors and a propulsion system with thrusters.

Detection, tracking and debris avoidance from a satellite is fundamentally superior from doing it elsewhere including from earth stations. Debris orbits are random and numerous, resulting in potential collision paths from anywhere in the spheroid around the satellite. Smaller, rapidly moving debris are particularly difficult to detect from earth stations which are often also limited by non-continuous coverage and by the inability to penetrate the atmosphere efficiently at various frequencies such as optical. Since, in many cases, avoidance must be accomplished in a very short period, autonomous operation in the satellite is faster than doing the same operations from earth station(s) due to command transit time between the station and satellite and other previously mentioned factors.

The description following of autonomous debris avoidance operations is described in terms of separate computer processors. In fact, these are software programs. The best way to implement them would be based on the computer/processor equipment on a particular satellite. Since many of the bigger satellites already have large computers with big memories, many or all of the debris avoidance software programs could be integrated into these computers or their modest expansions for this purpose.

The loss of a large satellite due to debris collision would be a very major operational and economic disaster. Operationally, large commercial communications and broadcast satellites each may serve millions of customers. Little spare on orbit satellite capacity exists, and these satellite operators generally have no alternatives, especially from an unplanned event. Particularly note that the production and launch of a replacement satellite of this type takes at least 3 years and often more. The cost of replacement is at least a quarter of a billion US dollars.

Accordingly, a satellite system is described herein which avoid collision with orbital debris and which addresses the above mentioned concerns The satellite system includes an orbital debris tracking means adapted to provide streams of tracking data on individual pieces of debris detected in the full spherical envelope around the satellite, an orbit determination processing means, an ephemeris processing means, a collision calculation means, a satellite avoidance orbit processing means, and a satellite avoidance commands processing means.

The means can be provided as one or more separate or integrated devices or software adapted to perform one or more of the functions described herein. Specifically, the orbit determination processing means is adapted to receive the tracking data from the orbital tracking means to compute the orbits of the debris. The ephemeris processing means is adapted to receive the debris orbital data from the orbital processing means and satellite orbital elements data from on-board sensors and/or the satellite's computer.

In addition, the orbit determination processing means is adapted to provide debris orbital elements data of the debris including semi-major axis, eccentricity, inclination, right ascension of ascending node, argument of perigee, period, time of perigee and their variances. Furthermore, the ephemeris processing means is adapted to calculate location ephemeris data for future positions of the debris relative to future positions of the satellite. Moreover, the collision calculation means is adapted to receive the location ephemeris data for a piece of debris and the location ephemeris data for the satellite from the ephemeris processing means.

Current satellite designs include low thrust, high efficiency electrical propulsion thruster to realize stationkeeping operations. Since these systems are only capable of small orbital adjustments, orbital corrections must occur at frequent intervals, sometimes twice per day. In light of consideration of planned, nominal orbital adjustments, the ephemeris processing means must therefore be aware of ongoing, or imminent station keeping operations when considering future possible collisions. In general, collision avoidance may be achieved with the addition of a collision avoiding orbit adjustment, the removal of one or more nominal stationkeeping adjustments, or a combination of both.

The collision calculation means is also adapted to provide a collision conclusion showing whether a collision would or would not occur at some future time between a piece of debris and said satellite. In addition, the satellite avoidance orbit processing means is adapted to receive output from the collision calculation means and to calculate a minimum change of the satellite's existing orbit to an orbit which avoids collision with said debris. Furthermore, the satellite avoidance commands processing means is adapted to receive the data for a minimum change in orbit, to calculate the required commands for the satellite thruster firings and to cause these commands to be executed.

In another embodiment of a satellite system according the invention, the orbital debris tracking means includes one or more radar or ladar which are adapted to provide coverage around the satellite for determining the angle, velocity and range of one or more pieces of debris from the satellite.

In another embodiment of a satellite system according to the invention, a telemetry system means and a command system means are also provided. These means are adapted to send and receive the data from the orbit determination processing means to a ground control station having one or more of the ephemeris processing means.

In a further embodiment of a satellite system according to the invention, the system is specifically adapted to autonomously avoid collision with orbital debris.

In an additional or alternative embodiment of a satellite system according to the invention, the orbital debris tracking means is selected from the group comprising radar, ladar, microwave radar, and optical recognition; wherein the orbital debris tracking means include one or more modes such as pulse mode, continuous mode, and/or Doppler mode; and wherein the orbital debris tracking means include one or more operating parameters such as pulse width, beam scan, frequency shift, radiated power output and/or bandwidth.

In a further embodiment of a satellite system according to the invention, a first tracking means is also provided for tracking debris having a range of high speeds, relative to the satellite, and a second tracking means is further provided for tracking debris having a range of low speeds relative to the satellite.

In a further embodiment of a satellite system according to the invention, a first tracking means is also provided for tracking debris having a range of large sizes, and a second tracking means is further provided for tracking debris having a range of small sizes.

In a further embodiment of a satellite system according to the invention, the ephemeris processing means is adapted to receive a portion of the debris orbital elements data from the orbital determination processing means and a portion of the satellite orbital elements data from on-board sensors and/or the satellite's computer. In addition, the ephemeris processing means is adapted to receive a portion of the debris orbital elements data from one or more ground stations and a portion of the satellite orbital elements data from one or more ground stations.

In a further embodiment of a satellite system according to the invention, the computer collision calculation means is adapted to determine a collision likelihood envelope for each piece of debris based upon an uncertainty measurement associated with one or more factors associated with the piece of debris. Such factors include the orbit, size and/or velocity data.

In a further embodiment of a satellite system according to the invention, the collision calculation means is further adapted to provide an output conclusion showing whether a collision would occur at some future time between a piece of debris and a future position of said satellite after the satellite undergoes an orbital change maneuver.

In a further embodiment of a satellite system according to the invention, the collision calculation means is adapted to maintain a matrix of orbital maneuver choices for the satellite, wherein each matrix element includes a risk assessment of collision.

In a further embodiment of a satellite system according to the invention, the collision calculation means is adapted to determine if a probability of collision of the orbital debris is below a predetermined threshold and to provide a conclusion including an ignore conclusion, and to provide the output of its probability determination to other orbital debris avoidance subsystems.

In a further embodiment of a satellite system according to the invention, the satellite orbital debris tracking means relays debris information to the ground which is then used to make collision predictions for other satellites. Debris information could be in the form of processed debris orbit determination results, or unprocessed radar/ladar data.

In a further embodiment of a satellite system according to the invention, the satellite avoidance orbit processing means is further adapted to choose a solution set of orbital maneuver choices from a matrix depending on one or more predetermined satellite operational performance parameters being fully functional at each orbital maneuver choice.

In a further embodiment of a satellite system according to the invention, the satellite avoidance orbit processing means is further adapted to choose a solution set of orbital maneuver choices from a matrix depending on a calculation of the minimum fuel required to achieve a new orbital avoidance solution.

In a further embodiment of a satellite system according to the invention, one or more of the means of the system is adapted to include a debris tracking dwell time for performing more accurate calculations or other functions of that means, which calculations are associated with one or more pieces of debris and that the means is further adapted to prioritize calculations based upon position and velocity of debris.

DETAILED DESCRIPTION

Figure 1:
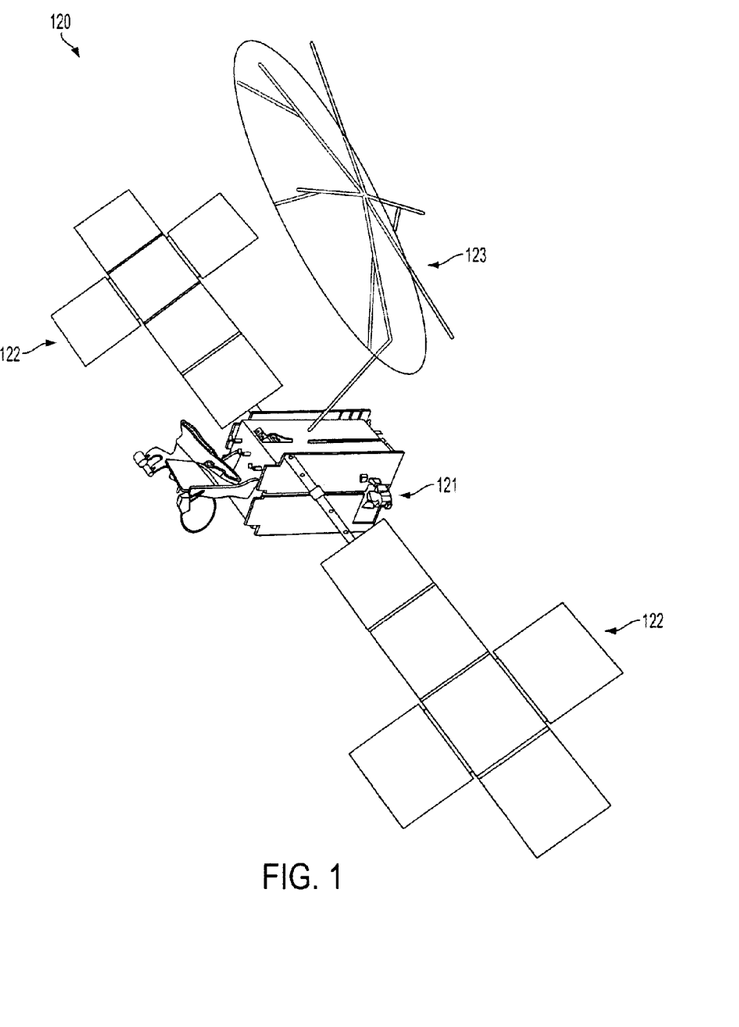
FIG. 1 illustrates a modern high capacity satellite used for communications and broadcast purpose(s), with a system to actively avoid collision with orbital debris.

A modern high capacity satellite 120 used for communications and broadcast purpose(s) is shown in FIG. 1 which can be adapted for use with the invention. Such satellites typically include functional equipment including one or more satellite thrusters 121, one or more power sources 122, as well as one or more antennae 123. It can be appreciated that the satellite 120 can include a number of systems, including systems associated with the primary function of the satellite, such as communication, broadcast, observation, and other systems, not shown. Some of such systems and functional equipment can cooperate with or be part of an orbital debris avoidance system according to the invention.

Figure 2:
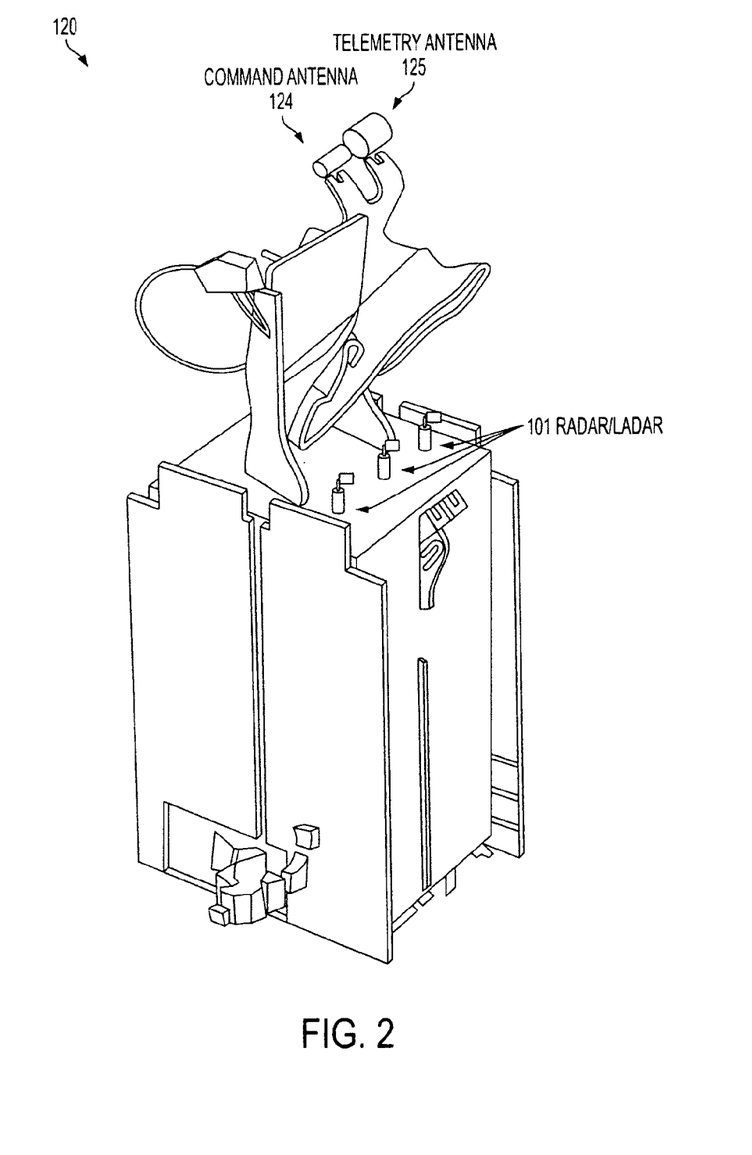
FIG. 2 illustrates an enlargement of the main body of the satellite. It shows the existing command and telemetry antennas for communication with the ground control station(s) and one possible location of three radars or ladars for tracking debris.

An enlargement of the main body of the satellite is shown in FIG. 2 and illustrates a command antenna 124 and a telemetry antenna 125 for communication with a ground control station(s) and one possible location of three orbital tracking devices 101, namely radars or ladars or other similar sensors/detectors for tracking debris. The locations and numbers of the antennae and orbital tracking devices will vary from satellite to satellite. The orbital tracking devices are preferably located to best be able to see unobstructed the full sphere around the satellite. At least two would normally be incorporated to achieve that visibility and to provide redundancy in case of failure. Not shown are the satellite sensors (e.g., sun, earth and stars) used internally to determine the satellite's location and attitude and the several propulsion thrusters used for orbit and attitude control, since they are standard on-board equipment. Also, internal to the satellite body are the computers/processors described below and the tanks holding the propulsion fuel which are used by the previously noted thrusters for controlling the satellite's orbit and attitude.

Figure 3:
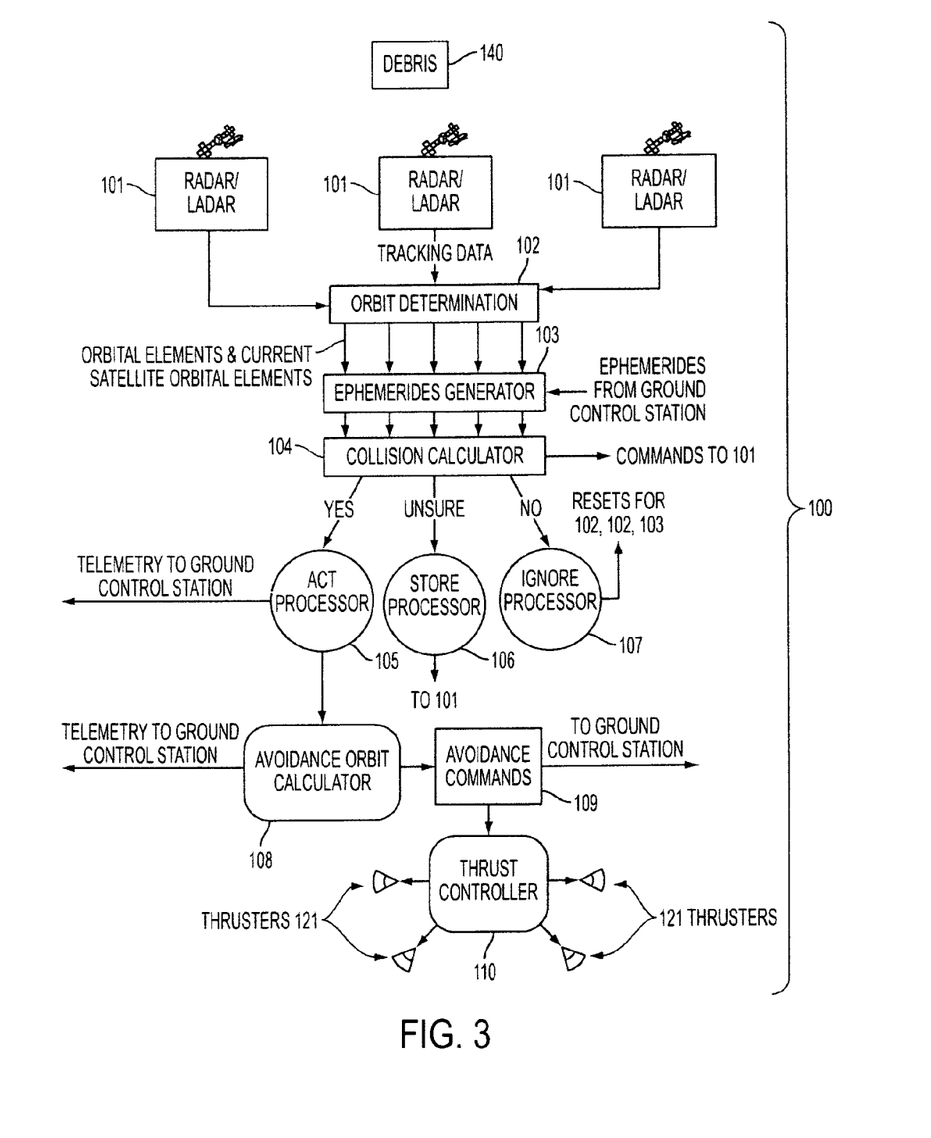
FIG. 3 is a flow diagram illustrating an embodiment of an orbital debris avoidance system according to the invention as implemented for a satellite and its connection to a ground control station for backup and other purposes.

A flow diagram in FIG. 3 illustrates the typical operation of the orbital debris avoidance system 100 as implemented on a typical satellite and its possible connection to the ground control station for backup and other purposes. It can be appreciated that an orbital debris avoidance system 100 need not necessarily include some of the standard equipment that may be included in a satellite such as antennas, sensors and/or communication and processor devices. The following description is provided in view of this consideration. Similarly, processors and devices described herein as having a described functionality could be provided as one or more general purpose computers or as one or more application specific integrated circuits (ASIC).

Often on satellites processors may be provided, since they typically are designed for a special purpose. However, several processors may be incorporated in a satellite computer. It can be appreciated that the satellite orbital debris avoidance system 100 can be embodied in one or more programmed computers, and/or ASICs, which can be embodied within processors to perform the functions of the system 100 according to the invention, as described herein. Thus, a system 100 according to the invention can be adapted or designed to cooperate with such devices and yet fall within the scope of the invention.

A system and method for satellite orbital debris avoidance 100 according to the invention allows an operating satellite to avoid orbital debris 140 and similar objects (e.g., meteors) autonomously or semi-autonomously. In one embodiment, a system 100 in FIG. 2 can be designed for a satellite having at least one orbital debris tracking device 101 to detect and track objects and provide tracking data. The orbital debris tracking devices 101 includes a processor and one or more detector/sensors, such as microwave or light (LADAR) frequency radars. Detector/sensors 101 may include higher frequency microwave or laser radars, which may be preferable under certain circumstances because their resolution of debris size and motion is better, the required antenna on the satellite will be smaller and atmospheric attenuation is not a problem (since the satellite and debris are typically well above the atmosphere). In addition, or in the alternative, detectors/sensors 101 can also include radar and optical sensors having recognition capability as well as other remote sensing devices. It can be appreciated by a person of ordinary skill in the art, in view of this disclosure of the invention, that variations in the orbital debris tracking device 101 can be implemented having one or more types of sensors 101 for different embodiments of a system 100 according to the invention.

FIG. 3 illustrates an embodiment of an orbital debris avoidance system 100 according to the invention that can include one or more orbital debris tracking devices 101 or can be connected to cooperate with existing orbital debris tracking devices provided with a satellite 120. In one embodiment, the orbital debris tracking devices are radars/ladars 101 which detect and track the orbital debris. Such devices should be able together to cover the full spherical envelope around the satellite since debris can arrive from any direction. Typically the devices provide tracking data which include the angle and range of the debris from the satellite using pulse modulation, but continuous wave type radars providing near instantaneous velocity between the satellite and debris may also be employed. There are also radars/ladars that can alternate modulation between continuous and pulsed. There are countless modes of radar/ladar operation including range only operation and dwell, where the radar/ladar scan of the spherical envelope is stopped and the tracking device is continuously pointed at a particular piece of debris for a predetermined period so more accurate and more rapid data would be available on that particular debris piece. The radar/ladar operational modes and modulation can also be optimized for tracking both on debris size and on velocity relative to the satellite. The tracking data is provided to the orbit determination processor 102 as streams of tracking data on various individual pieces of debris. The number of such streams could be unlimited but generally only several would be required simultaneously, since most debris will not be on a collision course.

An orbital tracking device 101 can receive commands from an orbital debris collision calculator 104 to modify the function mode of the device 101 according to the circumstances. For example, an embodiment of a system according to the invention can provide for shifting of modes between pulsed and continuous wave operation when tracking one or more of a first set of debris, such as debris having a greater proximity or likelihood of impact, and accordingly a continuous wave mode can be chosen, whereas a pulsed mode which uses less energy and processing can be employed for a second set of debris having less proximity or likelihood of impact. Alternatively, one or more of the separate modes can be dedicated to each tracking sensor 101 where a plurality of tracking devices 101 are employed. It can be appreciated that one or more of the functions of the orbital debris tracking processor can be included in other programming or processors of the system, such as the orbit determination processor 102.

The orbit determination processor 102 determines the orbits of the debris. The computer 102 takes the tracking data from each piece of detected debris and when sufficient information is collected over time, calculates the orbit of the debris. This is not difficult since the debris must follow a classic orbit originally formulated by Kepler as described by R. Bate, D. Mueller and J. White in Fundamentals of Astrodynamics; Dover Publications; New York; 1971. There are now other similar orbit determination formulations, some of which require less computing power. A processor 102 can be designed or programmed to determine what is known as the "orbital elements" of each piece of debris, such as semi-major axis, eccentricity, inclination, period, time of perigee, right ascension of ascending node, and their variances (i.e., the uncertainty in the elements). When each piece of detected orbital debris has its elements determined within a specified variance, the debris elements are sent to the ephemerides generator processor 103.

The ephemerides processor 103 takes the orbital elements and determines where the debris will be located in the future. This processor capability provides information called an ephemeris which is a standard type of orbital calculation for projection of an orbital object's future location and whose accuracy degrades with the length of the time from projection as well as the uncertainty in the orbital elements noted above.

The ephemerides processor 103 is also fed the orbital elements of the host satellite from processor 102, which were determined by the previously described on-board sensors or by previous ground control station upload. In an alternative embodiment, a ground control station can send such information to the ephemerides processor 103 through a command uplink subsystem. In another embodiment, anticipated nominal adjustments to the satellite's orbit can also be sent to the ephemerides processor 103, affording more accurate predictions. Reasons for the existence of such nominal orbital adjustments include orbital location maintenance, orbital relocation, de-orbiting operations, and other system performance considerations. The ephemerides processor 103 takes the satellite's orbital elements and, if required, nominal orbital adjustment information and converts them to an ephemeris for the satellite. These ephemerides data generated by the ephemerides processor 103 is sent to a collision calculator 104.

The collision calculator 104 is a processor which essentially functions as a comparator or a collision probability processor. It takes the ephemeris of each piece of debris and compares its future location with the ephemeris of the future location of the satellite. It outputs at least three results for each piece of debris. The act processor 105 receives and stores at least one result from the collision calculator 104 which determines that a collision is likely to occur at some future time within a predetermined threshold. The act processor 105 sends at least one result to the avoidance orbit calculator 108 and may also send the result to a ground control station by the telemetry subsystem.

The ignore processor 107 receives and stores at least one result from the collision calculator where the calculator 104 determines that a collision is not likely or not expected. In this case, the ignore processor 107 tells the tracking device 101, the orbit determination processor 102 and the ephemerides processor 103 to ignore that particular piece of debris. This ignore debris data is stored in the 101 processor memory so no further tracking of the object is performed. The store processor 106 receives and stores at least one result from the collision calculator where the calculator 104 determines that the variances are large enough to make a future collision uncertain within a predetermined threshold. In this case, the store processor 106 may just wait until more tracking data are accumulated on this piece of debris or may direct the radars/ladars 101 to accumulate more data, say by going to a dwell mode, or changing modulation type.

The avoidance orbit processor 108 essentially calculates the minimum change in the satellite's existing orbit to an orbit that will avoid the collision with the debris. Again, this is a standard calculation. The calculation is preferably performed so that the orbital change consumes the minimum amount of satellite on-board propellant. If the calculated time of the collision is either during or after an anticipated, nominal orbital correction maneuver, the avoidance orbit processor 108 may consider not executing this orbital correction in order to avoid the collision or combining the collision and correction maneuvers. This strategy could result in requiring very little, or even zero, additional on-board propellant.

The orbital change data are sent to the avoidance command processor 109 which calculates the required satellite maneuver commands (typically which thrusters will be used, the desired satellite attitude, the time and the duration of the thrusters' firings). The satellite commands are sent to a satellite thrust controller 110 that is typically included in a satellite. There can be at least two types of on-board satellite thrusters 121 in a satellite. One type is fueled by chemicals and can provide high amounts of thrust. The other is electronic which provides low thrust levels. The electronic is more efficient and is typically used for geostationary satellite orbital east west station keeping where low thrust levels are desirable. For the avoidance maneuver, the choice of thruster type (if more than one type is employed on the satellite) would be determined by the amount of orbit change required and the length of time available to accomplish it. As shown, these commands could also be sent from the avoidance command processor 109 to a ground control station through a telemetry subsystem so that the satellite operator knows what is occurring. Avoidance commands may also include instructions necessary to terminate or cancel anticipated, nominal satellite orbital adjustments which may be already in progress or scheduled in the satellite's memory.

Figure 4:
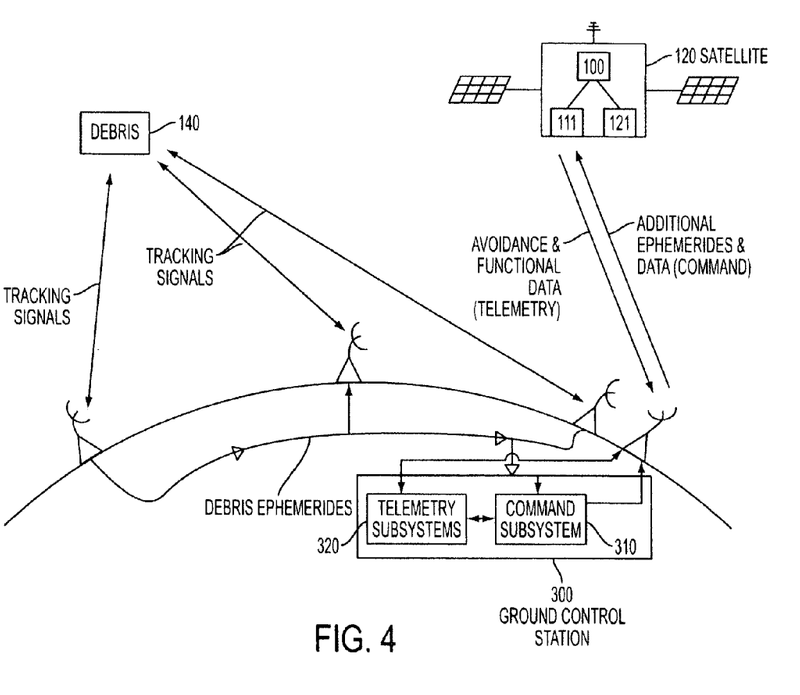
FIG. 4 shows an alternative embodiment of a satellite system according to the invention. Ground control earth station (s) can send additional data related to debris location and velocity and/or debris orbital ephemerides to the satellite system to supplement the data the satellite has autonomously collected or, if the satellite orbital debris data collection subsystem has failed, to allow the satellite avoidance system to continue operation using the data on debris locations/velocities collected by the ground station(s).

It is also possible to implement the invention in one or more semi-autonomous configurations or combinations. FIG. 4 shows one such alternative embodiment of a satellite system according to the invention.

Here, additional data on orbits of debris may be obtained from ground or space sources other than from tracking devices on the subject satellite. These data can be sent to the satellite through its ground control station 300 using its command subsystem 310 for use as a data augmentation to the satellite's generated tracking data. Also, if the satellite's orbital debris tracking subsystem fails and the remaining orbital avoidance subsystems are operable, the ground derived orbital debris locations/velocities can be used to continue normal satellite avoidance operations.

What is claimed:

1. A satellite system that can autonomously avoid collision with orbital debris including:
   An orbital debris tracking device adapted to provide tracking data on a piece of debris;
   an orbit determination processor adapted to receive said tracking data from said orbital debris tracking device and compute the orbits of the debris, to produce debris orbital element data, and to compute the satellite's orbital elements from on-board sensors or on-board stored data or both;
   an ephemeris processor adapted to receive said debris orbital element data from the orbital determination processor, and satellite orbital elements data, and to generate debris ephemeris data for future positions of the debris and future positions of the satellite;
   a collision calculator adapted to receive the future debris ephemeris data and the future satellite ephemeris data from said ephemeris processor; said collision calculator adapted to compare said future satellite and debris ephemeris data; and to provide an output conclusion, said output conclusion showing whether a collision would or would not occur at some future time between said debris and said satellite;
   an avoidance orbit processor adapted to receive an output conclusion that a collision is likely to occur and to calculate an avoidance orbit; and
   processors to create propulsion thruster commands to effect the avoidance orbit and to execute the commands.

2. A satellite system according to claim 1, wherein the orbital tracking device is selected from the group comprising radar, ladar, microwave radar, and optical or microwave recognition; and further comprising an avoidance command processor which receives the data for an avoidance orbit from the avoidance orbit processor, calculates the required commands for the satellite's thruster firings and causes these commands to be executed wherein said orbital tracking device is adapted to provide complete coverage of the spheroid around the satellite for determining the angle, velocity and range of debris from the satellite.

3. A satellite system according to claim 2, wherein a first orbit tracking device is provided for tracking debris having a range of high speeds, relative to the satellite, and a second tracking device is provided for tracking debris having a range of low speeds.

4. A satellite system according to claim 2, wherein a first tracking device is provided for tracking debris having a range of large sizes, and a second tracking device is provided for tracking debris having a range of small sizes.

5. A satellite system according to claim 1, wherein the ephemeris processor is adapted to receive a portion of the debris orbital elements data from the orbital determination processor and a portion of the satellite orbital elements data from on-board sensors or stored on-board data, and wherein the ephemeris processor is adapted to receive a portion of the debris orbital elements data from one or more ground stations and a portion of the satellite orbital elements data from one or more ground stations.

6. A satellite system according to claim 1, wherein the collision calculator determines a collision likelihood for each piece of debris based upon an uncertainty in measurements associated with the orbit, size and/or velocity data associated with the piece of debris.

7. A satellite system according to claim 1, wherein the collision calculator further provides an output conclusion showing whether a collision would occur at some future time between a piece of debris and a possible future position of said satellite after undergoing an orbital change avoidance maneuver.

8. A satellite system according to claim 1, wherein the collision calculator maintains a matrix of orbital maneuver avoidance choices for the satellite, wherein each matrix element includes a risk assessment of debris collision and the amount of on-board fuel required for each maneuver choice and the satellite's operational performance after each possible avoidance maneuver.

9. A satellite system according to claim 1, wherein the collision calculator is adapted to determine if a probability of collision with orbital debris is below a predetermined threshold and to provide at least one conclusion including an ignore conclusion.

10. A satellite system according to claim 1, wherein said satellite avoidance orbit processor is further adapted to choose a solution set of orbital maneuver choices from a matrix depending on one or more satellite operational performance parameters being fully functional for each orbital maneuver choice.

11. A satellite system according to claim 1, wherein said satellite avoidance orbit processor is further adapted to choose a solution set of orbital maneuver choices from a matrix depending on a calculation of the minimum fuel required to achieve the new orbital avoidance solution.

12. A satellite system according to claim 1, wherein the system includes a debris tracking dwell time for performing calculations associated with one or more pieces of debris and prioritizes calculations based upon position and velocity of debris.

13. A satellite system according to claim 9, wherein a satellite system device selected from the group comprising the orbital debris tracking device, orbit determination processor, collision calculator, and act processor, is adapted to ignore all or a portion of the data associated with an ignored object based on the ignore conclusion.

14. A satellite system according to claim 1, wherein the ephemeris processor is further adapted to receive a portion of the debris orbital elements data from the orbital determination processor and a portion of the satellite orbital elements data from the orbital determination processor, and wherein the ephemeris processor is adapted to receive a portion of the debris orbital elements data from one or more ground stations and a portion of the satellite orbital elements data from one or more ground stations.

15. A satellite system to permit a satellite to avoid collision with orbital debris including:
orbital debris tracking means adapted to provide streams of tracking data on individual pieces of debris detected in the full spherical envelope around the satellite, orbit determination processing means adapted to receive said tracking data from said orbital tracking means to compute the orbits of the debris, said orbit determination processing means providing debris orbital elements data of the debris including semi-major axis, eccentricity, inclination, right ascension of ascending node, argument of perigee, period, time of perigee and their variances;
ephemeris processing means adapted to receive the debris orbital data from the orbital processing means and satellite orbital elements data from on-board sensors or on-board stored data or both, and calculates location ephemeris data for future positions of the debris relative to future positions of the satellite;
a collision calculation means adapted to receive the location ephemeris data for a piece of debris and the location ephemeris data for the satellite from said ephemeris processing means, wherein said collision calculation means is adapted to provide a collision conclusion showing whether a collision would or would not occur at a future time between a piece of debris and said satellite;
a satellite avoidance orbit processing means adapted to receive output from said collision calculation means and to calculate a minimum change of the satellite's existing orbit to an orbit which avoids collision with said debris; and
a calculation means to create propulsion thruster commands to achieve the avoidance orbit and to execute the commands.

16. A satellite system according to claim 15, wherein said orbital debris tracking means includes one or more of the group comprising a radar and a ladar adapted to provide coverage around the satellite for determining the angle, velocity and range of debris from the satellite.

17. A satellite system according to claim 15, further comprising a telemetry system means and a command system means adapted to send and receive the data from the orbit determination processing means to a ground control station having one or more of the ephemeris processing means.

18. A satellite system according to claim 15, further comprising a satellite avoidance commands processing means adapted to receive the data for a minimum change in orbit, to calculate the required commands for the satellite thruster firings and to cause these commands to be executed.

19. A satellite system according to claim 15, wherein the orbital debris tracking means is selected from the group comprising radar, ladar, microwave radar, and optical recognition; wherein the orbital debris tracking means include one or more modes selected from the group comprising pulse mode, continuous mode, and Doppler mode; and wherein the orbital debris tracking means include one or more operating parameters selected from the group comprising pulse width, beam scan, frequency shift, radiated power output and bandwidth.

20. A satellite system according to claim 15, further comprising a first tracking means provided for tracking debris having a range of high speed, relative to the satellite, and a second tracking means for tracking debris having a range of low speeds.

21. A satellite system according to claim 15, further comprising a first tracking means for tracking debris having a range of large sizes, and a second tracking means for tracking debris having a range of small sizes.

22. A satellite system according to claim 15, wherein the ephemeris processing means is adapted to receive a portion of the debris orbital elements data from the orbital determination processing means and a portion of the satellite orbital elements data from on-board sensors or on-board stored data or both, and wherein the ephemeris processing means is adapted to receive a portion of the debris orbital elements data from one or more ground stations and a portion of the satellite orbital elements data from one or more ground control stations.

23. A satellite system according to claim 15, wherein the collision calculation means is adapted to determine a collision likelihood envelope for each piece of debris based upon an uncertainty value of the measurement associated with one or more factors associated with the piece of debris selected from the group comprising the orbit, size and/or velocity data.

24. A satellite system according to claim 15, wherein the collision calculation means is further adapted to provide an output conclusion showing whether a collision would occur at some future time between a piece of debris and a future position of said satellite after the satellite undergoes an orbital change maneuver.

25. A satellite system according to claim 15, wherein the collision calculation means is adapted to maintain a matrix of orbital maneuver choices for the satellite, wherein each matrix element includes a risk assessment of collision and the amount of on-board fuel required for each maneuver choice and the satellite's operational performance after each possible avoidance maneuver.

26. A satellite system according to claim 15, wherein the collision calculation means is adapted to determine if a probability of collision of the orbital debris is below a predetermined threshold and to provide at least one conclusion including an ignore conclusion.

27. A satellite system according to claim 15, wherein said satellite avoidance orbit processing means is further adapted to choose a solution set of orbital maneuver choices from a matrix depending on one or more satellite operational performance parameters being fully functional for each orbital maneuver choice.

28. A satellite system according to claim 15, wherein said satellite avoidance orbit processing means is further adapted to choose a solution set of orbital maneuver choices from a matrix depending on a calculation of the minimum fuel required to achieve the new orbital avoidance solution.

29. A satellite system according to claim 15, wherein the system includes a debris tracking dwell time for performing more detailed measurements associated with one or more pieces of debris and prioritizes avoidance calculations based upon position and velocity of debris.

30. A satellite system according to claim 26, further comprising a satellite system means selected from the group comprising the orbital debris tracking means, orbit determination processing means, collision calculation means, and act processing means, is adapted to ignore all or a portion of the data associated with an ignored object based on the ignore conclusion.

31. A satellite system according to claim 15, wherein the ephemeris processing means is adapted to receive a portion of the debris orbital elements data from the orbital determination processing means and a portion of the satellite orbital elements data from the satellite's computer, and wherein the ephemeris processing means is adapted to receive a portion of the debris orbital elements data from one or more ground stations and a portion of the satellite orbital elements data from one or more ground control stations.

* * * * *